(12) United States Patent
Raisch et al.

(10) Patent No.: US 9,457,808 B2
(45) Date of Patent: Oct. 4, 2016

(54) METHOD FOR SUPPORTING A DRIVER OF A MOTOR VEHICLE AND DEVICE FOR CARRYING OUT THE METHOD

(71) Applicant: ROBERT BOSCH GMBH, Stuttgart (DE)

(72) Inventors: Florian Raisch, Gaertringen (DE); Hans-Peter Huebner, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 39 days.

(21) Appl. No.: 14/356,836

(22) PCT Filed: Nov. 8, 2012

(86) PCT No.: PCT/EP2012/072108
§ 371 (c)(1),
(2) Date: May 7, 2014

(87) PCT Pub. No.: WO2013/068444
PCT Pub. Date: May 16, 2013

(65) Prior Publication Data
US 2015/0073661 A1    Mar. 12, 2015

(30) Foreign Application Priority Data

Nov. 11, 2011  (DE) .................... 10 2011 086 210

(51) Int. Cl.
*B60W 30/09*  (2012.01)
*B60W 30/06*  (2006.01)
(Continued)

(52) U.S. Cl.
CPC .............. *B60W 30/09* (2013.01); *B60W 30/06* (2013.01); *B60W 30/0956* (2013.01); *B62D 15/027* (2013.01); *B62D 15/0275* (2013.01); *B62D 15/0285* (2013.01); *B60W 2550/10* (2013.01)

(58) Field of Classification Search
CPC .... B60W 30/06; B60W 30/08; B60W 30/09; B60W 30/0956; B60W 2250/10; B62D 15/027; B62D 15/0275; B62D 15/028; B62D 15/0285
See application file for complete search history.

(56) References Cited

U.S. PATENT DOCUMENTS 5,742,141 A * 4/1998 Czekaj ........................ 180/167
5,945,799 A * 8/1999 Shimizu ............ B62D 15/0285
                                                      701/41
6,097,314 A * 8/2000 Desens .............. B62D 15/0285
                                                     180/167

(Continued)

FOREIGN PATENT DOCUMENTS

DE        103 24 810      12/2004
DE      10 2004 029985     1/2006
(Continued)

*Primary Examiner* — Dale W Hilgendorf
(74) *Attorney, Agent, or Firm* — Norton Rose Fulbright US LLP

(57) ABSTRACT

A method for supporting a driver of a motor vehicle during a driving maneuver, including the following: (a) determining a driving path in which the motor vehicle moves when the driving maneuver is carried out and automatically or semi-automatically carrying out the driving maneuver; (b) detecting the surroundings of the motor vehicle during the driving maneuver; (c) stopping the motor vehicle if an object is detected in the driving path and resuming the driving maneuver as soon as the object has left the driving path and/or decelerating the motor vehicle and slowly resuming the driving maneuver if an object is detected outside the driving path. Also described is a device for carrying out the method.

10 Claims, 2 Drawing Sheets

(51) Int. Cl.
*B60W 30/095* (2012.01)
*B62D 15/02* (2006.01)

(56) References Cited

U.S. PATENT DOCUMENTS

| | | | |
|---|---|---|---|
| 6,170,591 B1* | 1/2001 | Sakai et al. ............... 180/204 |
| 6,173,215 B1* | 1/2001 | Sarangapani ...... B60K 31/0008 |
| | | | 701/301 |
| 6,275,754 B1* | 8/2001 | Shimizu ............ B62D 15/0285 |
| | | | 701/41 |
| 7,089,101 B2* | 8/2006 | Fischer ............... B62D 15/028 |
| | | | 701/300 |
| 2004/0210350 A1* | 10/2004 | Rao ................... B60R 21/0134 |
| | | | 701/1 |
| 2007/0282499 A1* | 12/2007 | Maeda et al. ................... 701/41 |
| 2009/0319112 A1* | 12/2009 | Fregene ............... B60W 30/16 |
| | | | 701/23 |
| 2014/0188364 A1* | 7/2014 | Kang ...................... B60T 7/22 |
| | | | 701/70 |

FOREIGN PATENT DOCUMENTS

| | | |
|---|---|---|
| DE | 10 2005 004394 | 8/2006 |
| DE | 10 2007 049709 | 4/2009 |
| DE | 10 2008 019346 | 9/2009 |
| DE | 10 2009 029456 | 3/2011 |
| DE | 10 2009 046674 | 6/2011 |
| DE | 10 2010 002105 | 8/2011 |
| EP | 1 447 271 | 8/2004 |
| EP | 2 050 640 | 4/2009 |
| EP | 2 327 574 | 6/2011 |
| WO | 2011/016367 | 2/2011 |

* cited by examiner

METHOD FOR SUPPORTING A DRIVER OF A MOTOR VEHICLE AND DEVICE FOR CARRYING OUT THE METHOD

FIELD OF THE INVENTION

The present invention relates to a method for supporting a driver of a motor vehicle during a driving maneuver. The present invention also relates to a device for carrying out the method.

BACKGROUND INFORMATION

Various methods and driver assistance systems for supporting a driver of a motor vehicle during a driving maneuver are already available on the market. In particular, driver assistance systems are known which support the driver during slow driving maneuvers, for example, when parking the vehicle. Here, a distinction is made between systems which inform the driver of distances to objects in the surroundings of the vehicle, so that the driver may reduce the speed of the vehicle when approaching an object and stop the vehicle if necessary, and semi-automatic and automatic systems.

In semi-automatic driver assistance systems, the surroundings of the motor vehicle are detected, a trajectory for carrying out the driving maneuver is calculated and steering instructions are given to the driver. The longitudinal and transverse guiding continues to rest with the driver of the motor vehicle, however. Furthermore, systems are also known in which either only the longitudinal guiding or only the transverse guiding is automatically carried out by the driver assistance system. Here, in a system in which the transverse guiding rests with the driver, instructions on steering angles are given. In a system in which the longitudinal guiding rests with the driver, instructions for decelerating and for changing from driving forward to driving in reverse are given.

In automatic systems, the surroundings of the motor vehicle are also detected, a trajectory for carrying out the driving maneuver is calculated and the driving maneuver is automatically carried out by the driver assistance system, both with respect to longitudinal as well as transverse guiding.

Regardless of the type of support, it is necessary for the driver to monitor the driving maneuver when it is carried out and, if necessary, intervene by, for example, aborting the driving maneuver if an object is situated in the driving path which, for example, has not been detected by the driver assistance system, or if a moving object moves into the driving path. Alternatively, the driver may also retake control by, for example, setting a steering angle which differs from the preset steering angle for carrying out the driving maneuver, in order, for example, to bypass a potential obstacle.

A method for supporting a driver of a motor vehicle during a parking procedure is discussed in DE 103 24 810 A1. In this method, the transverse guiding of the vehicle is taken over automatically. Actuation of the steering wheel by the driver causes an oversteer of the preset transverse guiding and the automatic parking process is aborted. A disadvantage of the method known from the related art is that each time a driver oversteers, the driving maneuver is aborted. A continuation of the driving maneuver when, for example, the object moves out of the driving path, is not possible. The driving maneuver is also aborted in principle; a continuation of the driving maneuver at a reduced speed, for example, is also not provided.

SUMMARY OF THE INVENTION

A method is provided according to the present invention for supporting a driver of a motor vehicle during a driving maneuver, which includes the following steps:
(a) determining a driving path in which the motor vehicle moves as the driving maneuver is carried out and automatically or semi-automatically carrying out the driving maneuver,
(b) detecting the surroundings of the motor vehicle during the driving maneuver,
(c) stopping the motor vehicle if an object is detected in the driving path and continuation of the driving maneuver once the object has left the driving path and/or decelerating the motor vehicle and slow continuation of the driving maneuver if an object is detected outside the driving path.

As a result of the method according to the present invention, the driver is supported during driving maneuvers without the driving maneuver being aborted, for example, upon detection of an object in the vicinity. In particular, it is advantageous that the driving maneuver is resumed if the detected object is not situated in the driving path. Thus, the driver also receives support when an object is in the vicinity of the vehicle, but does not impede the driving maneuver. A further advantage is that when an object is detected in the driving path, the driving maneuver is merely interrupted and not aborted. If the object situated in the driving path moves further and leaves the driving path again, the driving maneuver is then resumed.

In one specific embodiment of the present invention the driving maneuver automatically carried out is aborted as soon as the driver of the motor vehicle actuates the accelerator pedal. By actuating the accelerator pedal, the vehicle is initially accelerated. The result is generally an increase in the speed of the motor vehicle to a speed which is too high for continuing the driving maneuver being automatically carried out. Moreover, the option is given that the driver may override the system, for example, in the event of an intention change, allowing the driving maneuver to be aborted.

It may also be that the driving maneuver is not aborted when the speed of the motor vehicle is reduced. In the driver assistance systems known from the related art, the driving maneuver is generally aborted when the driver applies the brake of the motor vehicle. However, a reduction in speed may also be necessary, for example, if an object is situated in the surroundings of the vehicle, for example, a movable object, which crosses the planned driving path. In such a case, it is necessary, for example, to reduce the speed of the driving maneuver; an abortion is, however, not necessary. If the object is not accurately detected by the system, this gives the driver the opportunity to reduce the speed without aborting the driving maneuver. In one specific embodiment it is possible in such a case for the driver to decelerate the vehicle to a standstill, but once the brake is released, the driving maneuver is resumed.

An abortion of the driving maneuver is possible, for example, by actuating a corresponding function switch.

The method according to the present invention may be applied in automatic systems as well as in semi-automatic systems. In an automatic system, the driving maneuver is carried out automatically by the driver assistance system. In this case, the driver assistance system automatically controls longitudinal guiding, i.e., acceleration and deceleration of the vehicle, and transverse guiding, i.e., steering movements.

In a semi-automatic system it is possible, for example, for longitudinal guiding to occur automatically and for the driver of the motor vehicle to receive instructions on transverse guiding. Alternatively, it is also possible for longitudinal guiding to rest with the driver and for transverse guiding to be carried out automatically. When longitudinal guiding rests with the driver, a strong acceleration in particular results in abortion of the automatic driving maneuver.

Steering instructions, in the event the driving maneuver is carried out semi-automatically, may be acoustic, visual or haptic. In the case of acoustic instructions it is possible, for example, to provide the driver instructions necessary for steering the vehicle using a voice output system. In a visual system, the driver may be provided instructions on the appropriate steering angle via a graphic display. It is possible, for example, to indicate via an arrow display in which direction the steering wheel should be moved and to indicate by a flashing or fading out of the arrow that the steering wheel should be moved no further. It particularly may be the case, however, that the driver is provided haptic instructions for transverse guiding. For this purpose, it is possible, for example, that the steering wheel is given a torque which prompts the driver to steer. In such a case, it is possible, for example, that a sensation is generated as if the vehicle were traveling in a rut. To steer the vehicle in a direction not provided by the driver assistance system, increased force must be applied. This may result, in one specific embodiment of the present invention, in an abortion of the driving maneuver, since the vehicle is now no longer moving in the calculated driving path.

In a semi-automatic driving maneuver, the driving maneuver may be aborted when the driver disregards a steering instruction and an object is situated in the driving path through which the motor vehicle will likely pass. In this way a collision with the object is avoided in the event the driver disregards the system steering instructions.

In order to detect the environment of the motor vehicle during the driving maneuver, any arbitrary surroundings sensors may be used. Distance sensors, for example, ultrasonic sensors, radar sensors, infrared sensors or lidar sensors are normally used. Alternatively, it is also possible to use other video sensors, and to implement detection of the surroundings by image processing.

If during detection of the surroundings of a motor vehicle an object is identified in the driving path, it is ascertained in one specific embodiment of the present invention whether the object may be bypassed. If bypassing is possible, a new driving path is determined as the object is bypassed and the driving maneuver is carried out in such a way that the motor vehicle moves within the new driving path. With the calculation of the new driving path, a dynamic system is achieved which also ends the driving maneuver if an object moves into the originally calculated driving path or is situated in the originally calculated driving path, which in known systems would have resulted in abortion. The driving maneuver is ended only when bypassing of the object in the driving path is impossible. In such a case, it is also possible that before the final abortion of the driving maneuver there is an initial wait to see whether the object moves further and leaves the driving path or moves in a direction which makes bypassing the object possible. The driving maneuver is finally aborted, only if after a predefined period of time bypassing of the object is no longer possible or for a predefined period of time the object does not move. The period of time awaited until the final abortion of the driving maneuver may, for example, be preset in a driver assistance system used to carry out the method. Alternatively, it is also possible for a corresponding period of time to be preset by the driver of the motor vehicle. In this case, the period of time until final abortion may be selected in such a way that the wait time until final abortion is not perceived by the driver as unpleasant.

A device for carrying out the method according to the present invention includes an arrangement for determining a driving path in which the vehicle moves during the driving maneuver, an arrangement for detecting the surroundings of the motor vehicle and an arrangement for automatically or semi-automatically carrying out the driving maneuver, the arrangement for automatically or semi-automatically carrying out the driving maneuver being configured in such a way that the vehicle is stopped if an object is detected in the driving path and the driving maneuver is resumed as soon as the object has left the driving path and/or the motor vehicle is decelerated and the driving maneuver is slowly resumed if an object is detected outside the driving path.

The arrangement for determining a driving path in which the motor vehicle moves during the driving maneuver in general includes a processor and a computer program, which is used to determine the driving path along which the vehicle moves during the driving maneuver, based on the surroundings data of the motor vehicle. For this purpose, a conventional control unit may be used, for example, as is used in driver assistance systems. Ultrasonic sensors, infrared sensors, radar sensors, lidar sensors or other sensors, such as video sensors, for example, are suitable as the arrangement for detecting the surroundings of the motor vehicle.

Exemplary embodiments of the present invention are represented in the figures and are explained in greater detail in the following description.

DETAILED DESCRIPTION

Figure 1:
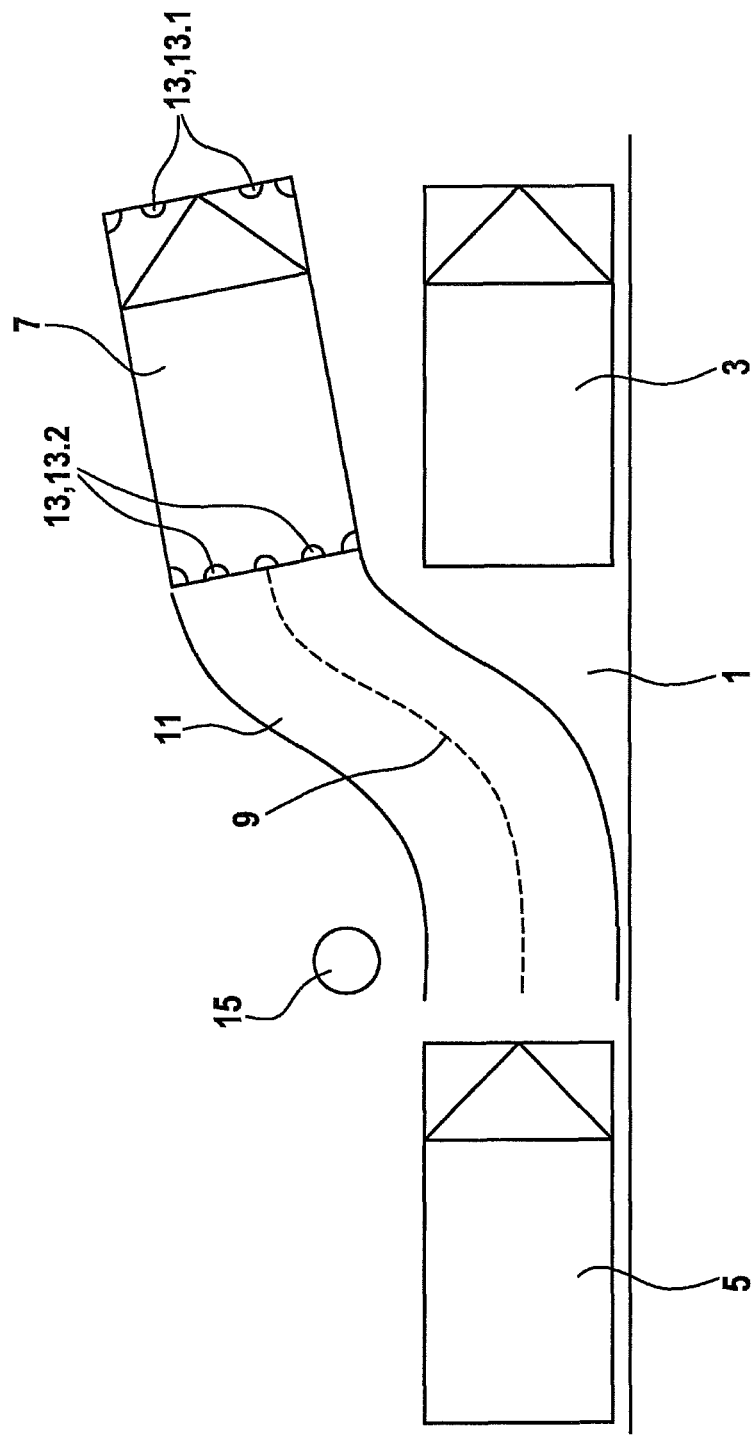
FIG. 1 schematically shows a representation of a parking maneuver.

FIG. 1 schematically shows a parking maneuver into a parallel parking space.

In the situation depicted in FIG. 1, a parallel parking space 1 is bordered by a vehicle 3 to the front and a vehicle 5 to the rear. The driving maneuver being carried out by a motor vehicle 7 is a parking maneuver into parallel parking space 1, motor vehicle 7 backing into the parking space.

In order to park in parallel parking space 1, motor vehicle 7 moves along a trajectory 9. The area motor vehicle 7 passes over when parking in parallel parking space 1 is designated as driving path 11.

To support the driver when parking motor vehicle 7, the parking maneuver into parallel parking space 1 is carried out automatically or semi-automatically. For this purpose, parallel parking space 1 is first measured when passing by parallel parking space 1 and trajectory 9 is calculated based on the data.

To measure parallel parking space 1, the surroundings of motor vehicle 7 are detected when passing. Sensors 13 are used for this purpose. In order to be able to detect the surroundings, the vehicle includes front sensors 13.1 at the front end and rear sensors 13.2 at the rear end. Front sensors 13.1 are used to detect the surroundings ahead of the motor vehicle and rear sensors 13.2 the surroundings behind the motor vehicle.

Sensors 13 used to detect the surroundings are normally distance sensors, for example, ultrasonic sensors, infrared sensors, radar sensors or lidar sensors, or visual sensors, for example cameras, are used. In the case of distance sensors, a signal is transmitted from the sensor and an echo of the signal reflected off an object is received. The distance to the object is determined based on the transit time between transmission of the signal and receipt of the echo and the speed of propagation of the signal. In order to detect the direction, at least two sensors are required, the object being situated at the point of intersection of the distance signals of the sensors. When using a camera, detection is accomplished via image processing.

After determining the trajectory, which is calculated in a suitable control unit, driving path 11 may then also be determined. In the process, the boundaries of the driving path are determined for a right-hand turn by the back left corner and the front right corner of the vehicle, and for a left-hand turn by the front left corner and the back right corner of motor vehicle 7.

Once driving path 11 and trajectory 9 are determined, the driving maneuver may be carried out. Here, it is possible to either carry out the driving maneuver semi-automatically or to carry out the driving maneuver automatically.

When carrying out the driving maneuver semi-automatically, the driver of motor vehicle 7 takes control of the longitudinal guiding, i.e., braking and accelerating the vehicle, and the transverse guiding, i.e., steering movements, are automatically carried out by a driver assistance system with which the method is implemented. Alternatively, it is also possible for the longitudinal guiding to be controlled by the vehicle and for the driver of the motor vehicle 7 to be provided instructions for required steering movements to carry out the driving maneuver. Here, the instructions given for carrying out the steering movements may, for example, be visual, acoustic or haptic. In the case of acoustic instructions, it is possible, for example, to direct the driver, using a suitable voice output, as to how to steer the vehicle. In the case of a visual display, it is possible, for example, to indicate the required steering angles with suitable arrow displays. A haptic system makes it possible by applying a torque to the steering wheel to induce the driver to move the steering wheel while exerting the smallest amount of force so that the driving maneuver is carried out as if motor vehicle 7 is moving in a rut.

In a driving maneuver carried out automatically, both longitudinal guiding and transverse guiding of motor vehicle 7 are taken over by the driver assistance system.

To take over the longitudinal guiding it is possible, for example, that from a suitable control unit signals are transmitted to the fuel supply of the engine or to the braking system and the vehicle being accelerated or decelerated accordingly. To carry out transverse guiding it is possible, for example, that by using a suitable servo-motor the steerable wheels of motor vehicle 7 are aligned in the direction in which motor vehicle 7 is intended to be moved.

While the driving maneuver is being carried out, the surroundings of the motor vehicle continue to be detected with sensors 13, 13.1, 13.2. In particular, it is checked whether an object 15 is situated near the driving path. If an object 15 is situated near driving path 11, the speed with which the driving maneuver is carried out is reduced. If object 15 moves into driving path 11, motor vehicle 7 is stopped and the driving maneuver is interrupted in order to avoid a collision with object 15. If object 15 moves further and leaves the driving path again, the driving maneuver may then be resumed. The driving maneuver is aborted only if object 15 no longer moves out of driving path 11. Alternatively, it is also possible, if an object 15 is situated in driving path 11, to initially check whether it is possible to bypass object 15 by calculating a new trajectory and the resulting driving path is such that object 15 is no longer situated in the driving path. In bypassing object 15 in this case, the driving maneuver may be resumed.

Object 15 which may interrupt the driving maneuver, and which may be situated in driving path 11 or near driving path 11 may be, for example, immobile objects, such as posts, flower boxes, walls, barriers or other vehicles, or also mobile obstacles, such as toys, such as balls or the like, or other road users, such as pedestrians, bicyclists, motorcyclists or other motor vehicles using the road.

In addition to a parking maneuver into a parallel parking space, as shown in FIG. 1, the method according to the present invention may also be used for any other arbitrary driving maneuvers which are carried out, which may be at low speed. Other driving maneuvers are, for example, shunting maneuvers, parking into a perpendicular parking space, the parking maneuver being able to be carried out forward or in reverse, forward parking into a parallel parking space or also driving around tight turns, such as in a parking garage.

Figure 2:
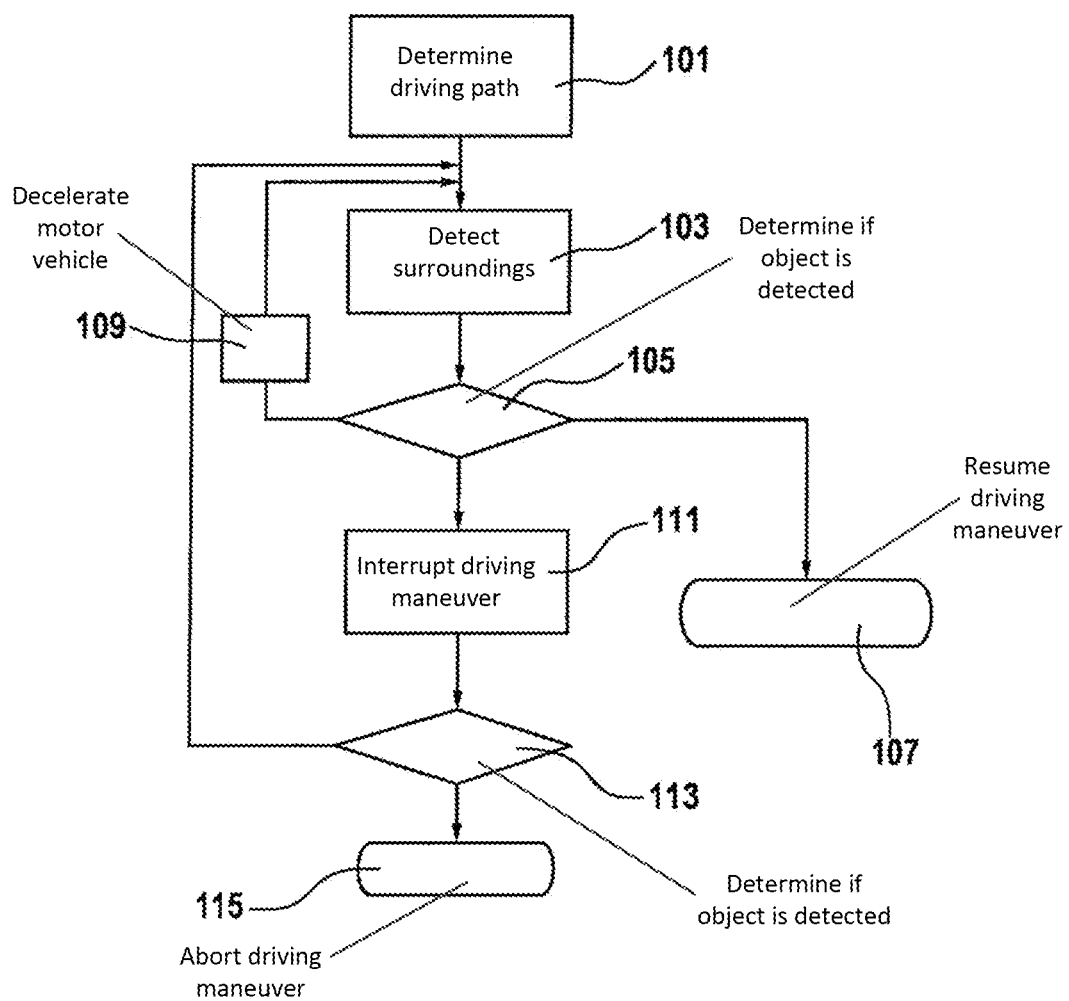
FIG. 2 shows a flow chart of the method according to the present invention.

The method according to the present invention is further explained in FIG. 2 in the form of a flow chart.

Driving path 11 is determined in a first step 101. For this purpose, for example, a trajectory is initially calculated along which the driving maneuver is carried out. In this step, the trajectory is usually the path covered by the midpoint of the rear axle of motor vehicle 7. As an alternative to the midpoint of the rear axle, however, any arbitrary point of the vehicle is conceivable as a reference point for the trajectory. Thus, for example, the midpoint of the front axle, the midpoint of the vehicle or a vertex of the vehicle may be selected for determining the trajectory.

The driving path determined in first step 101 is the area passed over during the driving maneuver of motor vehicle 7 and is usually defined by each of the outermost corners of the motor vehicle.

After the driving path is determined in a first step 101, the surroundings are detected in a second step 103 as the driving maneuver is carried out. Detection of the surroundings is accomplished with suitable sensors which are fitted on motor vehicle 7. As previously mentioned, distance sensors, such as ultrasonic sensors, lidar sensors, infrared sensors or radar sensors are usually used. Alternatively, it is also possible to employ other visual sensors, for example, video cameras.

In a subsequent step 105, it is checked whether during detection of the surroundings in step 103 an object has been detected. If in step 105 no object is found, the driving maneuver is resumed in a subsequent step 107.

If in third step 105 an object is detected near driving path 11, the motor vehicle is decelerated in a step 109 and the driving maneuver is resumed at a reduced speed. This includes returning to step 103 and continuing to detect the surroundings of the vehicle and checking for objects. In this step it is in particular further monitored whether the object detected outside the driving path moves and, for example, moves in the direction of the driving path, or whether it is a fixed object outside of the driving path.

If in step 105 an object is detected which is situated in driving path 11, the driving maneuver is interrupted in a subsequent step 111. For this purpose, motor vehicle 7 is initially stopped. Stopping motor vehicle 7 prevents a collision with object 15 from occurring.

Following step 111, in which the driving maneuver is interrupted, is a further step 113, in which it is checked whether the object is still situated in the driving path. If after a predefined period of time which, for example, may be preset by the driver of the motor vehicle, and which is stored in a driver assistance system with which the method is carried out, object 15 continues to be in driving path 11, the driving maneuver is finally aborted in a concluding step 115. If the object moves, object 15 is further observed and it is detected in which direction the object moves. If the object has moved out of the driving path, the driving maneuver is resumed by further detecting the surroundings and accelerating the vehicle again in order to conclude the driving maneuver.

In another embodiment it is also possible, upon locating an object in step 105, that the driving maneuver is not interrupted, but an alternative trajectory is calculated with which the object may be bypassed. Only if it is impossible to bypass the object is the driving maneuver interrupted or then also aborted.

The driver is provided with improved assistance as a result of the recalculation of a trajectory when detecting an object in the driving path, or as a result of the interruption of the driving maneuver and subsequent resumption. Even when detecting an object which is situated near the driving path or in the driving path, it is possible to resume the driving maneuver either along an alternate route or after the object has left the driving path.

What is claimed is:

1. A method for supporting a driver of a motor vehicle during a driving maneuver, the method comprising:
   (a) determining, by a driver assistance system, a driving path, in which the motor vehicle moves while the driving maneuver is carried out and automatically or semi-automatically carrying out the driving maneuver;
   (b) detecting, by the driver assistance system, the surroundings of the motor vehicle during the driving maneuver;
   (c) if an object is detected in the driving path stopping, by the driver assistance system, the motor vehicle and resuming, by the driver assistance system, the driving maneuver as soon as the object has left the driving path; and
   (d) if the object is detected outside the driving path, decelerating, by the driver assistance system, the motor vehicle and slowly resuming, by the driver assistance system, the driving maneuver,
   wherein the driving maneuver carried out automatically is aborted as soon as the driver of the motor vehicle actuates an accelerator pedal.

2. The method of claim 1, wherein the driver of the motor vehicle can reduce the speed of the motor vehicle at any time without the driving maneuver being aborted.

3. The method of claim 1, wherein longitudinal guiding occurs automatically when the driving maneuver is carried out semi-automatically and the driver of the motor vehicle receives instructions for transverse guiding.

4. The method of claim 3, wherein the instructions for transverse guiding are haptic steering instructions.

5. The method of claim 1, wherein at least one of an ultrasonic sensor, a radar sensor, an infrared sensor, a lidar sensor, and a video sensor is used to detect the surroundings of the motor vehicle during the driving maneuver.

6. The method of claim 1, wherein, during detection of the object in the driving path, it is ascertained whether it is possible to bypass the object, and if bypassing is possible a new driving path is determined while bypassing the object and the driving maneuver is carried out so that the motor vehicle moves within the new driving path.

7. The method of claim 6, wherein the driving maneuver is ended if bypassing of the object in the driving path is not possible.

8. The method of claim 1, wherein the driving maneuver is aborted if the driver disregards a steering instruction during a semi-automatic driving maneuver and the object is situated in the driving path which is likely to be driven through by the motor vehicle.

9. A device for carrying out the method for supporting a driver of a motor vehicle during a driving maneuver, the method, comprising:
   a determining arrangement to determine a driving path, in which the motor vehicle moves during the driving maneuver;
   a detecting arrangement to detect the surroundings of the motor vehicle; and
   an arrangement for automatically or semi-automatically carrying out the driving maneuver, the arrangement for automatically or semi-automatically carrying out the driving maneuver being configured so that (a) the motor vehicle is stopped if an object is detected in the driving path and the driving maneuver is resumed as soon as the object has left the driving path, and (b) the motor vehicle is decelerated and the driving maneuver is slowly resumed if the object is detected outside the driving path, wherein the driving maneuver carried out automatically is aborted as soon as the driver of the motor vehicle actuates an accelerator pedal.

10. The device of claim 9, wherein the detecting arrangement for detecting the surroundings of the motor vehicle includes at least one of an ultrasonic sensor, an infrared sensors, a radar sensor, a lidar sensor, and a video sensor.

* * * * *